Sept. 27, 1966 R. M. DAKIN 3,274,773
GOVERNOR CONTROL FOR A FUEL SYSTEM OF A GAS
TURBINE POWER-PRODUCING PLANT
Filed Jan. 13, 1964
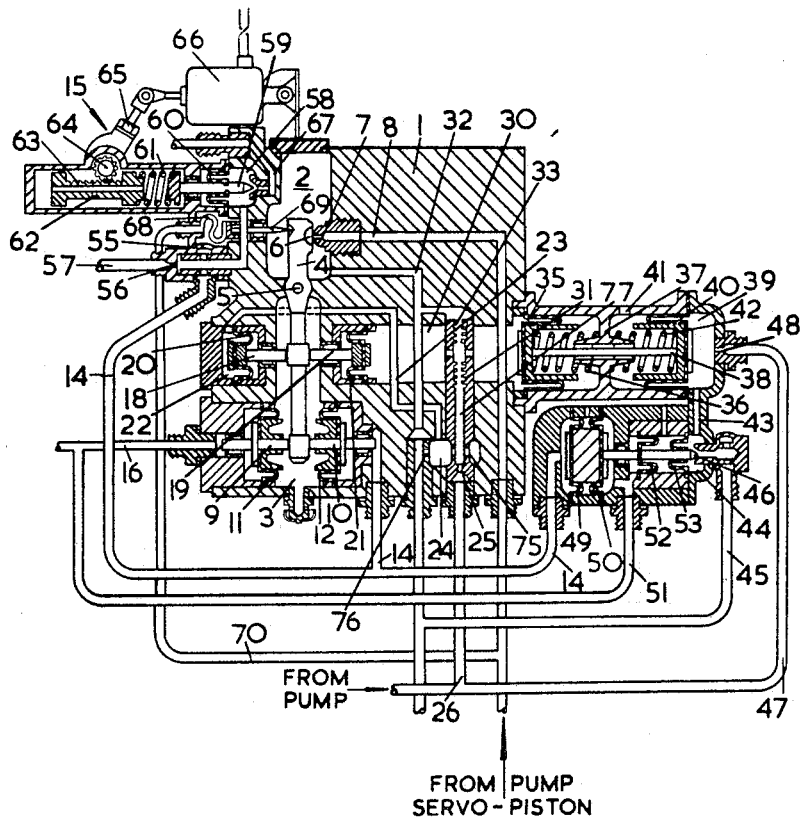

3,274,773
GOVERNOR CONTROL FOR A FUEL SYSTEM OF A
GAS TURBINE POWER-PRODUCING PLANT
Robin M. Dakin, Coventry, England, assignor to Bristol
Siddeley Engines Limited, Bristol, England
Filed Jan. 13, 1964, Ser. No. 337,251
Claims priority, application Great Britain, Jan. 16, 1963,
1,930/63
4 Claims. (Cl. 60—39.28)

The invention relates to a governor control for a fuel system of a gas turbine power-producing plant, including a power turbine, the governor control being of the kind (hereinafter referred to as the kind described) in which a valve member, e.g., a half-ball valve, arranged to control the fuel supply to the plant is carried by a pivotally-mounted arm, which is maintained substantially in balance, when the power turbine is operating at its governed speed, by a first pair of pressure-responsive means arranged to apply a first pair of opposed forces on the arm, one of the said first means being responsive to a pressure signal, dependent upon turbine speed, and the other first means being responsive to a fluid pressure signal, representing a datum speed, and by a second pair of pressure-responsive means, arranged to apply a second pair of opposed forces on the arm, one of the said second means being responsive to a direct feed-back pressure derived from the fuel being controlled and the other of the said second means being responsive to a delayed feed-back pressure derived via a restricting means from the fuel being controlled, the delayed feed-back pressure initially differing from the direct feed-back pressure, but after a time delay due to the restricting means will assume the value of the direct feed-back pressure or a predetermined ratio thereof.

A control of this kind has been described in our co-pending application No. 282,708 filed May 23, 1963, now Patent No. 3,203,178 granted August 31, 1965 and the purpose of the second pair of pressure-responsive means is to stabalise the arm and hence to provide stable and sensitive governing and also to achieve a desired speed/load characteristics. However, with a very rapid change of load or selected speed, there may be considerable momentary deviation from the desired speed. An object of the present invention is to provide further means whereby the delayed feed-back effect can be modified in response to rate of change of governed speed, irrespective of actual speed error, whereby the said deviation is substantially reduced.

According to the invention, a governor control of the foregoing kind includes a chamber, having a restricted inlet leading from a fuel supply line, a restricted outlet, a first pressure-responsive device, responsive to the internal pressure in the chamber and constituting the aforesaid delayed feed-back means, a second pressure-responsive device, positioned remotely from the first device and responsive to the internal pressure in the chamber, resilient means acting on the second device in opposition to the internal pressure, and a further pressure-responsive device capable of applying an external pressure signal on the second device, the latter thereby being operable to vary the internal pressure in the chamber, as a result of the combined effect of the fluid pressure forces and the resilient means acting on the second pressure-responsive device, the external pressure signal being a function of the difference between the aforesaid turbine speed and datum speed pressure signals applied respectively to said first pair of pressure-responsive means.

Conveniently, a pressure amplifying device is provided, whereby a small difference between the turbine speed and the datum speed pressure signals results in a larger external signal pressure being applied to the second pressure-responsive device by said further pressure-responsive device.

The variation of the pressure within the chamber by the application of the said external pressure signal is referred to hereinafter as "derivative feed-back."

A governor control having delayed and derivative feed-back according to this invention will now be described with reference to the accompanying diagrammatic drawing which shows the governor control unit in cross-section.

The unit includes a block 1 containing two cavities 2 and 3 into which extend the opposite end portions of an arm 4, pivotally mounted in the block at 5. Adjacent the end of the arm 4 which extends into the cavity 2 there is a half-ball valve 6, which opens and closes a seat 7, communicating with a pipe 8, containing pump servo-fluid and connected to actuate the servo piston of a rotary fuel pump (not shown). The cavity 2 communicates with the spill return to the pump inlet and the cavity 3 communicates with atmosphere. The portion of the arm 4, extending into the cavity 3, is engaged by two opposed plungers 9, 10 carried respectively on diaphragms 11, 12, or equivalent pressure-responsive means. The diaphragm 11 is subjected to a pressure signal applied through a pipe 16 from a pressure generating device (not shown) rotatable by the power turbine being governed, i.e. the pressure signal applied to the diaphragm 11 is responsive to engine speed. The diaphragm 12 is subjected to a pressure signal, representing a datum speed, applied through a pipe 14 from an adjustable governor datum actuator, shown generally by 15 and which will be described in more detail hereinafter.

At position intermediate the pivot 5 of the arm 4 and the positions of engagement therewith of the plungers 9 and 10, the arm 4 is engaged by a second pair of opposed plungers 18, 19 carried respectively on pressure-responsive diaphragms or equivalent means 20, 21. The diaphragm 20 is subjected to pressure in a chamber 22, connected by duct 23, passing through the block 1 behind the cavity 3 to a chamber 24, supplied through a first flow-restricting orifice 25 and then a second flow-restricting orifice 75 from a fuel supply pipe 26 leading from the fuel pump. The chamber 24 has a restricted outlet 76 communicating with a spill return pipe 32, leading to the cavity 2 and hence to the pump inlet. The pressure in the chamber 22 is substantially the same as in the chamber 24 and constitutes a direct feed-back pressure. The diaphragm 21 is responsive to the pressure within a chamber 30 within the block 1, this being supplied with fuel via the pipe 26, the orifice 25, a duct 77 and a bank of flow restrictors 31. An outlet from the chamber 30 to the spill return pipe 32 is provided through a further bank of flow restrictors 33, the flow restrictors 31 and 33 together producing a pressure in the chamber 30 which under steady conditions is lower than that in the duct 77.

The end of the chamber 30 remote from the diaphragm 21 is formed by a further diaphragm 35, or equivalent pressure-responsive device, biased inwardly into the chamber 30 by a spring 36, abutting a fixed partition 37 in the block 1. The diaphragm 21, the chamber 30, the flow restrictors 31 and 33, the diaphragm 35 and the spring 36 together form a delayed feed-back device similar to that described in the aforesaid application No. 282,708, except that the present device is intended for controlling liquid fuel and not a gaseous fuel, as in the said co-pending application.

The diaphragm 35 is mechanically coupled by a rod 38 to another diaphragm 40, or equivalent pressure-responsive device, responsive to fuel pressure in a chamber 39. The diaphragm 40 is biased in the opposite direction to the diaphragm 35 by a spring 42 also bearing against the partition 37. Thus when the diaphragm 35 moves inwardly of the chamber 30, the diaphragm 40 will move outwardly of the chamber 39 and vice versa. The interior of the block 1 between the diaphragms 35 and 40 communicates with atmosphere through an outlet port 41. The chamber 39 is connected by a passage 43 to another chamber 44, from which fuel is allowed to be spilled to the pump inlet via a needle valve 46 and a pipe 45 communicating with the spill return pipe 32. Fuel from the pump delivery is supplied to the chamber 39 via a restrictor 48 and a pipe 47. The needle of the valve 46 is moved axially by a pair of differentially arranged diaphragms 49, 50 responsive respectively to the datum speed pressure in the pipe 14 and the turbine speed pressure in the pipe 16, this latter pressure being applied through a branch pipe 51. Thus the valve 46 is opened or closed in response to the difference between the turbine and datum speed pressure signals. The turbine speed pressure applied to the diaphragm 50 is also applied to a smaller diaphragm 52, arranged to effect a biasing force on the valve 46. The pressure in the chamber 44 and hence in the chamber 39 acts on a diaphragm 53 attached to the needle of the valve 46. The latter assumes a balanced position in accordance with the pressure in the chamber 44 acting on the diaphragm 53 and the pressures acting on the diaphragms 49, 50 and 52. By making the diaphragm 53 of small diameter compared with the diaphragms 49 and 50, a large amplification effect can be obtained or, in other words, a small difference between the turbine and datum speed pressures will result in a large pressure change in the chamber 44 and hence in the chamber 39. The function of the biasing diaphragm 52 is to enable the pressure in the chamber 39, with no speed error, i.e. the turbine speed is equal to the datum speed to which the governor has been set, to be approximately half the maximum value that will be experienced during operation of that unit. Thus if the actual speed is greater than the datum, the pressure in the chamber 39 will be reduced and if the actual speed is lower than the datum, the pressure in the chamber 39 will be increased. Without the diaphragm 52 there would be no signal to the chamber 39 when the turbine speed pressure is greater than datum, as the valve 46 would then be fully open. This would limit the device to action only when the speed falls below datum, which would be undesirable.

An instantaneous change in the pressure in the chamber 30 cannot occur, provided that the pressure in the chamber 39 remains constant, due to the consequent movement of the springs 36 and 42 and the diaphragms 35, 40, so that if the fuel pressure increases suddenly, the pressure in the chamber 30 will slowly rise until the diaphragms 35 and 40 have ceased to move. Conversely the pressure in the chamber 30 will fall slowly when the fuel pressure suddenly decreases.

Where there is a sudden increase in turbine speed, there will be a larger sudden reduction in pressure in the chamber 39 and this will result in a sudden reduction in pressure in the chamber 30. The latter pressure will then slowly assume its original value, determined by the pressure in the duct 77, when the diaphragm 35 has assumed a new stationary position. Conversely for a sudden decrease in turbine speed, the pressure in the chamber 30 will suddenly increase and then slowly assume its original value.

For a rapid change of speed error, a large ultimate signal results in the chamber 30 and for a slow rate of change of speed error, a proportionally smaller ultimate signal results in the chamber 30. For example, if the turbine speed should suddenly start to increase very rapidly, the pressure in the chambers 44 and 39 will start to fall very rapidly, this resulting in an initial rapid fall of the pressure in the chamber 30. However this will cause an increased flow through the inlet restrictors 31 and a decreased flow through the outlet restrictors 33. After a short time, the resultant rate of change of flow into the chamber 30 will match that required by the outward movement of the diaphragm 35. At this stage, the pressure in the chamber 30 will become steady at a lower value determined by the rate at which the pressure in the chamber 39 is changing. The new pressure in the chamber 30 then has the effect of opening the halfball valve 6 and reducing the fuel supply to the plant considerably more quickly than the reduction that could be obtained by the sole action of the turbine speed pressure signal applied to the arm 4 through the pipe 16, the diaphragm 11 and the plunger 9. Thus the turbine speed increase signal is modified very rapidly by a derivative feed-back pressure signal reducing the pressure acting on the delayed feed-back diaphragm 21.

Although the adjustable governor datum actuator shown generally by arrow 15 does not form part of this invention, it will now be briefly described. The pipe 14 communicates with an annular gallery 55, which is supplied with pressurised oil through a pipe 57 and a fixed restrictor 56. The pipe 57 also communicates with a chamber 58, which communicates under the control of a needle valve 59 with a duct 67 leading to the oil pump inlet. Thus according to the amount of opening of the needle valve 59, there is a variable flow through the pipe 57 and the fixed orifice 56 to the pump inlet, this affecting the pressure in the pipe 14 and therefore the datum applied to the plunger 10 and to the diaphragm 49. The plunger of the needle valve 59 is attached to a diaphragm 60 and is also acted upon by a spring 61 which is engaged by a slide 62. The slide 62 carries a rack 63 engaged by a pinion 64 which is turned by an arm 65 operated by an electric actuator 66. This part of the apparatus forms the subject of our co-pending application No. 313,291 filed Oct. 2, 1963 and its operation is described therein. It is considered to be sufficient for the purpose of the present application to say that when the slide 62 is moved by the actuator 66, the pressure in the chamber 58 is altered as the needle valve 59 is moved, thereby altering the pressure in the pipe 14, and hence the force applied by the plunger 10 on the arm 4, and the pressure applied to the diaphragm 49, thereby effecting an adjustment in the fuel flow to the burners of the plant.

From the accompanying drawing it will be seen that a pipe 70 is branched from the pipe 8 and leads to a Bourdon type tube 68 which acts on a plunger 69 bearing against the arm 4 at a position opposite the half-ball valve 6 for the purpose of cancelling the effect of the servo-pressure on the half-ball valve 6 and hence on the arm 4. The tube 68 and the plunger 69 form the subject of our co-pending application No. 337,252, filed January 13, 1964 and is described therein.

What I claim as my invention and desire to secure by Letters Patent of the United States is:

1. A governor control for a fuel system of a gas turbine power-producing plant, including a power turbine, the governor control comprising a pivotally-mounted arm; a valve member carried on said arm and arranged to control the fuel supply to said plant; a first pair of pressure-responsive means positioned to apply a first pair of opposed forces on said arm, one of said first means being responsive to a pressure signal dependent upon turbine speed and the other of said first means being responsive to a fluid pressure signal representing a datum speed; a second pair of pressure-responsive means arranged to apply a second pair of opposed forces on said arm, one of said second means being responsive to a direct feedback pressure derived from the fuel being controlled and the other of said second means being responsive to a delayed feed-back pressure; means defining a chamber; a restricted inlet to said chamber from a fuel supply line; a restricted outlet from said chamber; a first pressure-responsive device, responsive to the internal pressure in said chamber and constituting said delayed feedback means; a second pressure-responsive device, positioned remotely from said first device and responsive to the internal pressure in said chamber; resilient means acting on said second device in opposition to said internal pressure, and a further pressure-responsive device applying an external pressure signal on said second device, the latter thereby being operable to vary the internal pressure in said chamber, as a result of the combined effect of the fluid pressures and the resilient means acting on said second pressure-responsive device, said external pressure signal being a function of the difference between said turbine speed and datum speed pressure signals applied respectively to said first pair of pressure-responsive means.

2. A governor control as claimed in claim 1 including a pressure amplifying device, whereby a small difference between said turbine speed and the datum speed pressure signals results in a large external signal pressure being applied to said second pressure-responsive device by said further pressure-responsive device.

3. A governor control for a fuel sytem of a gas turbine power-producing plant, including a power turbine, the governor control comprising a pivotally-mounted arm; a valve member carried on said arm and arranged to control the fuel supply to said plant; a first pair of pressure-responsive means positioned to apply a first pair of opposed forces on said arm, one of said first means being responsive to a pressure signal dependent upon turbine speed and the other of said first means being responsive to a fluid pressure signal representing a datum speed; a second pair of pressure-responsive means arranged to apply a second pair of opposed forces on said arm, one of said second means being responsive to a direct feed-back pressure derived from the fuel being controlled and the other of said second means being responsive to a delayed feed-back pressure; means defining a first chamber; a restricted inlet to said first chamber from a fuel supply line; a restricted outlet from said first chamber; a first diaphragm responsive to internal pressure in said first chamber and constituting said delayed feed-back means; a plunger carried by said first diaphragm and engaging said arm; a second diaphragm responsive to internal pressure in said first chamber and spaced from said first diaphragm, first spring means acting on said second diaphragm and biasing it inwardly of said first chamber in opposition to the pressure therein; means defining a second chamber; a restricted inlet to said second chamber from said fuel supply line; an outlet from said second chamber; a valve controlling said outlet from said second chamber; a third diaphragm forming a wall of said second chamber and responsive to pressure therein; second spring means biasing said third diaphragm inwardly of said second chamber; means connecting said second and third diaphragms for movement as a coupled unit; a further pair of differentially-arranged diaphragms connected to move said valve and responsive respectively to said turbine speed and datum speed pressure signals and a fourth diaphragm also connected to move said valve and subjected to a function of the fluid pressure within said second chamber, the effective area of said fourth diaphragm being smaller than the effective areas of the said differentially-arranged diaphragms, thereby to effect an amplification of the movement of said valve due solely to the said differentially-arranged diaphragms.

4. A governor control as claimed in claim 3 in which there is a fifth diaphragm connected to move said valve in opposition to the said differentially-arranged diaphragm responsive to turbine speed, the effective area of the said fifth diaphragm being smaller than the effective area of said differentially-arranged diaphragm, thereby partly to counteract the fluid force on the latter.

No references cited.

WILLIAM F. O'DEA, *Primary Examiner.*

C. GORDON, *Assistant Examiner.*